United States Patent [19]

Lee

[11] Patent Number: 5,034,830
[45] Date of Patent: Jul. 23, 1991

[54] IDLING ROTATION MECHANISM USED IN THE HOUSING OF A VIDEO CASSETTE TAPE RECORDER

[75] Inventor: Jung-Jae Lee, Seoul, Rep. of Korea

[73] Assignee: SamSung Electronics Co., Ltd., Suwon, Rep. of Korea

[21] Appl. No.: 454,464

[22] Filed: Dec. 21, 1989

[30] Foreign Application Priority Data

Jun. 9, 1989 [KR] Rep. of Korea .................... 89-8076

[51] Int. Cl.⁵ .................. G11B 15/675; G11B 25/06
[52] U.S. Cl. ........................................................ 360/85
[58] Field of Search .................................... 360/85, 95

[56] References Cited

U.S. PATENT DOCUMENTS

| 4,807,065 | 2/1989 | Kwon | 360/85 |
| 4,884,153 | 11/1989 | Ahn | 360/85 |
| 4,912,578 | 3/1990 | Katohno et al. | 360/85 |

Primary Examiner—John H. Wolff
Attorney, Agent, or Firm—Robert E. Bushnell

[57] ABSTRACT

An idling rotation mechanism in a housing of a video cassette tape recorder, including a cassette loading device for loading and unloading a cassette in and out of a deck, a tape loading device for moving a video cassette tape inserted in the deck into a position of magnetic transformation, a single motor for driving the cassette loading device and the tape loading device, said motor being able to rotate in clockwise and counterclockwise direction, a loading cam device for preventing the tape loading device from being driven during the operation of the cassette loading device, and an idling rotation device of the housing for preventing the cassette loading means from being driven during the operation of the tape loading device, after the completion of the cassette loading. Both the operation of the cassette holder and the idling rotation may be simultaneously attained according to the present invention.

16 Claims, 3 Drawing Sheets

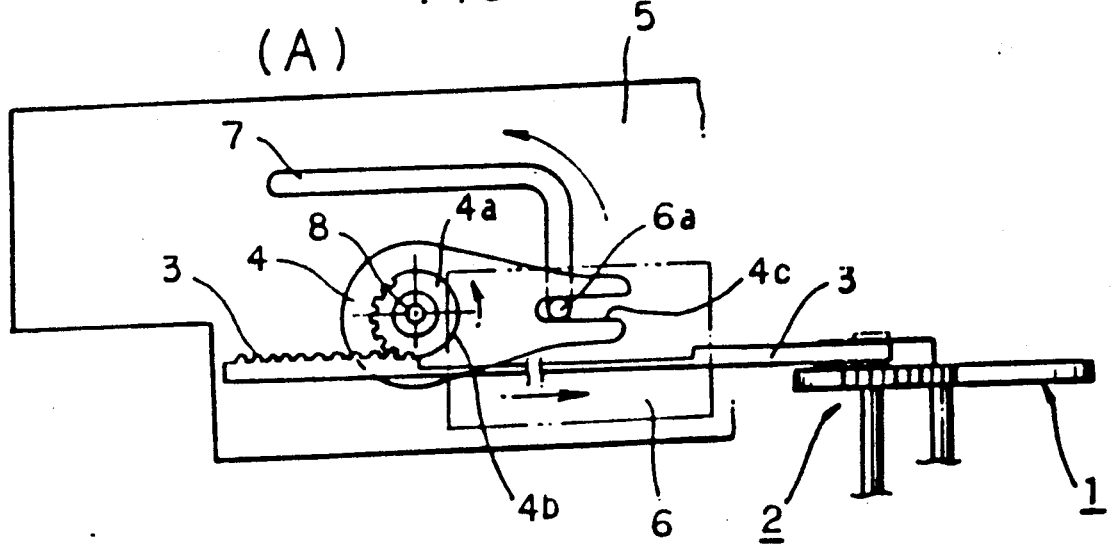
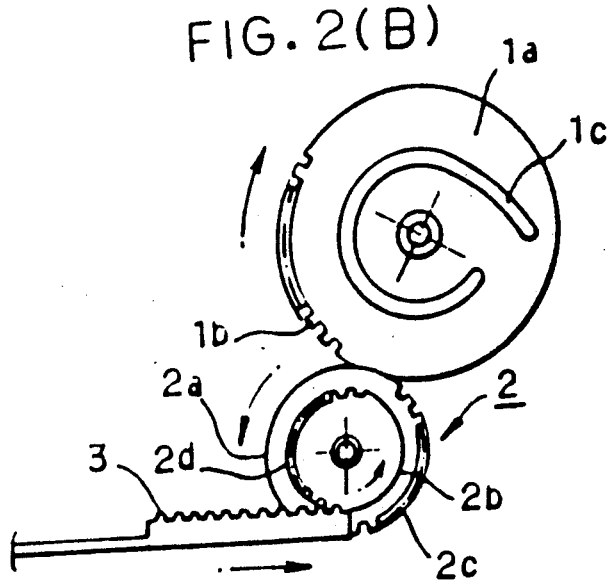

IDLING ROTATION MECHANISM USED IN THE HOUSING OF A VIDEO CASSETTE TAPE RECORDER

BACKGROUND OF THE INVENTION

The present invention relates to an idling rotation mechanism used in the housing of a video cassette tape recorder (VTR), which rotates idly by itself as well as operates a cassette holder through reciprocating rectilinear motion of a rack by a loading cam, which includes circular cam part and a geared part.

Conventionally, a VTR includes a housing motor for moving the video cassette tape (VCT) in and out of the VTR, and a separate loading motor for moving the inserted VCT in and out of a drum. The housing motor and the loading motor are separately driven during the initial and the final operation of the VTR.

Thus, the conventional VTR, having a plurality of component elements for both the housing motor and the loading motor, becomes quite complicated. As a result of the added complication of a separate housing and a loading motor, the rate of malfunctioning is quite high, repairs become more difficult, and the size and weight of the VTR must be increased to accomodate the added components. Consequently, it becomes difficult to make a compact and light VTR having both a loading motor and a housing motor.

Moreover, in the front loading type VTR, the idling rotation mechanism is attached on the outside of the housing, which includes timer gears, worm gear housing and eject springs on the side arm to operate the cassette holder and to mount and dismount the cassette tape on the head drum. But as a result of the complexity of the mechanism, the assembly operations become more difficult and the production costs become higher.

SUMMARY OF THE INVENTION

It is an object of the present invention to provide an idling rotation mechanism used in the housing of a VTR so that a single driving source can mount and dismount a VCT from the VTR as well as load and unload the VCT from the playback and recording tap heads, thereby simplifying the structure of the idling rotation and the component elements to cut down the production costs and the assembling time to improve the productivity and the miniaturization of the products.

To achieve the above-mentioned object, an idling rotation mechanism of the present invention includes: a cassette loading device for loading and unloading a cassette in and out of a deck; a tape loading device for moving a video cassette tape inserted in the deck into a position of magnetic transformation; a single motor for driving the cassette loading device and tape loading device, the motor being able to rotate in the clockwise directions and counter clockwise; a loading cam device for preventing the tape loading device from being driven during the operation of the cassette loading device; and an idling rotation device of the housing for preventing the cassette loading device from being driven during the operation of the tape loading device, after the completion of the cassette loading.

BRIEF DESCRIPTION OF THE DRAWINGS

These and other objects, features, and advantages of the present invention will become more apparent from the following description for the preferred embodiments taken in conjunction with the accompanying drawings, in which:

FIG. 2(A) and FIG. 2(B) are a side view and a plan view illustrating the tape recorder housing of the present invention after a VCT has been loaded into the VTR, respectively.

DESCRIPTION OF THE PREFERRED EMBODIMENT

The present invention will now be described specifically with reference to the accompanying drawings.

Figure 1:
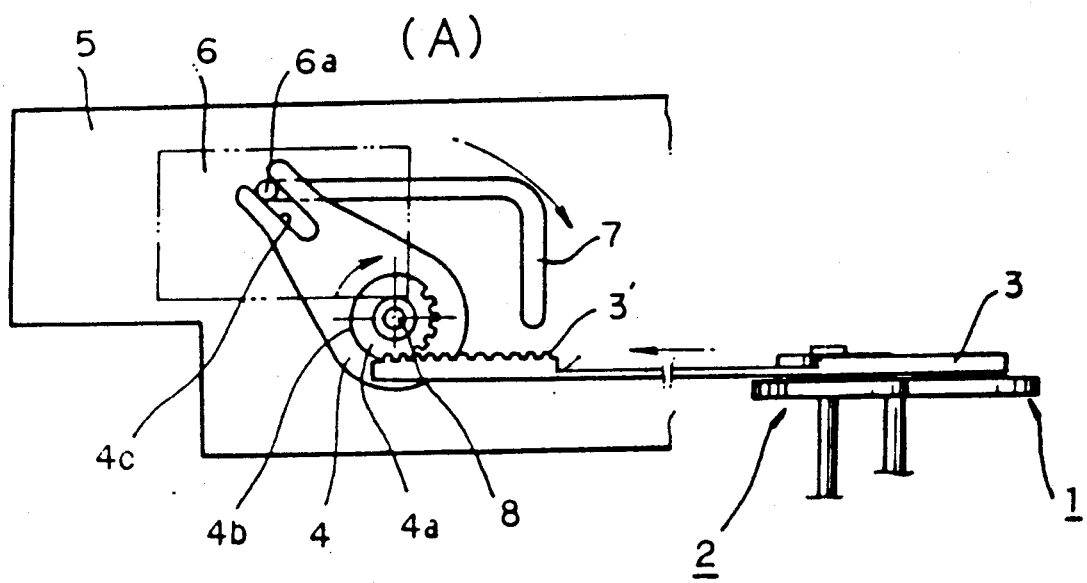
FIG. 1(A) and FIG. 1(B) are a side view and a plan view of a tape recorder housing of the present invention illustrating the initial stage before a VCT is inserted into the VTR, respectively.
Figure 1:
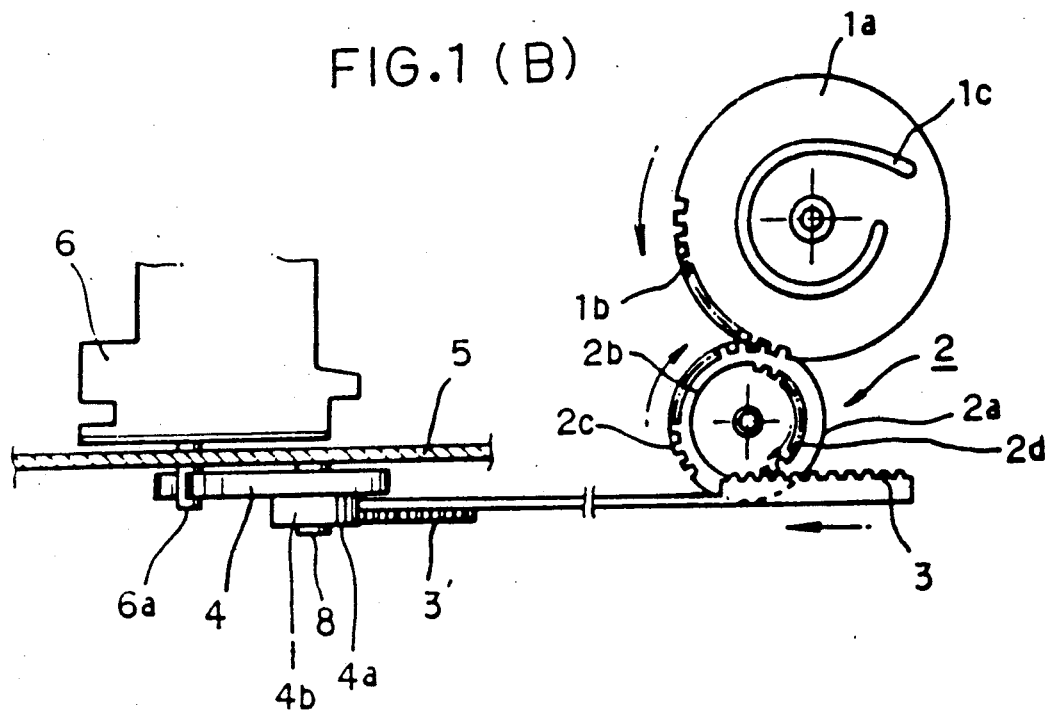

In the embodiment of the present invention, FIG. 1 and FIG. 2 are views illustrating an idling rotation mechanism of a housing of the present invention. A loading cam 1, driven by a loading motor (not shown), is established on a shaft formed in a deck (not shown). A circular cam part (nongeared part) 1a and a geared part 1b are formed on the periphery of the loading cam 1, and a cam groove 1c is formed in the flat surface of the loading cam 1. Further, a pinion 2 is established in a side of the loading cam 1 and the pinion 2 is driven by the rotational force of the loading cam 1. The pinion 2 is formed with a double pinion and a circular cam part 2a, a geared part 2c and a cam part 2b are formed on the periphery of circular cam part 2a and the double pinion, respectively. The geared part 2c of the pinion 2 is engaged with the geared part 1b of the loading cam 1 to rotate the pinion 2.

On the other hand, a pair of racks 3 and 3' are integrally formed, and the geared part 2d formed on the pinion 2 is engaged with the rack 3. Also, the rack 3' is engaged with an operating gear 4a of a side arm 4 which is fitted with a supporting shaft 8 mounted on the side face of a housing 5 to be rotated along with the supporting shaft 8.

A circular cam part 4b is formed on the other periphery of the operating gear 4a. Further, an operating groove 4c is formed in the side arm 4 to hang a holder pin 6a secured to a cassette holder 6 into the groove 4c. The holder pin 6a is slidingly moved along a guide slot 7 formed on the side wall of the housing.

Therefore, the rotational force transmitted to the pinion 2 by the loading cam 1 is transmitted to the side arm 4 via the racks 3 and 3' to operate the cassette holder 6. Moreover, the loading cam 1 can rotate idly by the ciruclar cam part 1a of the loading cam 1 and the circular cam part 2a of the pinion 2.

Figure 3:
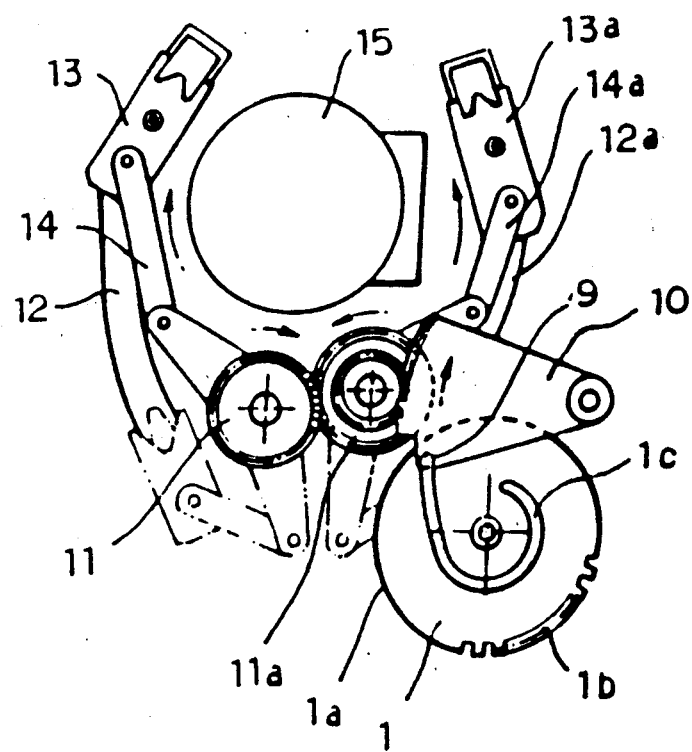
FIG. 3 is a view showing a loading operation of a tape in accordance with the present invention.

Referring to FIG. 3, the cam groove 1c is formed on the loading cam 1, a sector gear 10 is connected with the same groove 1c by a pin 9. A tape loading gear 11 is engaged with the sector gear 10 and another tape loading gear 11a is engaged with the tape loading gear 11. Two pole bases 13 and 13a are connected with the loading gears 11 and 11a via links 14 and 14a respectively to move along a pair of loading grooves 12 and 12a and to closely contact a tape onto a drum 15 when the tape is laoded.

The operation of the present invention with the above structure will now be explained.

As shown in FIG. 1, when the VCT is inserted into the cassette holder 6 in the housing 5, the loading motor (not shown) is activated by sensors located in the cassette holder 6. The loading cam 1 is rotated in a counterclockwise direction as shown in FIG. 1(B) by the rotational force of the loading motor transmitted to the loading cam 1.

Therefore, the rotational force of the loading cam 1 is transmitted to the pinion 2 since the geared part 1b formed on the loading cam 1 is in mesh with the geared part 2c of the pinion 2. The rack 3 is moved in a left direction in FIG. 1(B) according to the clockwise rotation of the pinion 2 since the other geared part 2d formed on the pinion 2 is in mesh with the rack 3. The driving force is transmitted to the rack 3' formed integral with the rack 3.

Further, the operating gear 4a of the side arm 4 engaged with the rack 3' is rotated around the supporting axis 8 along with the side arm 4 in a clockwise direction. Accordingly, the holder pin 6a hung in the operating groove 4c of the side arm 4 slides down along the guide slot 7 formed on the side wall of the housing 5 to load the cassette tape inserted into the cassette holder 6 as shown in FIG. 2(A).

At this time, a tape loading device having the sector gear 10 and the loading gears 11 and 11a is not driven since the device rotates along the track of the concentric circle of the cam groove 1c formed on the loading cam to have no displacement.

On the other hand, when the geared part 1b of the loading cam 1 is disengaged with the geared part 2c of the pinion 2, the circular cam part 1a of the loading cam 1 contacts with the other circular cam part 2a of the pinion 2, so that the rotational force of the loading cam 1 is not transmitted to the pinion 2. Consequently, the rotation of the pinion 2 is discontinued and the loading cam 1 rotates idly by itself.

At this time, the sector gear 10 is rotated simultaneously with the idling rotation of the loading cam 1, while the pin 9 hung in the cam groove 1c of the loading cam 1 is moved along the cam groove 1c as shown in FIG. 3. The loading gear 11a engaged with the sector gear 10 and the other loading gear 11 engaged with the loading gear 11a are rotated to move the pole bases 13 and 13a along the loading groove 12 and 12a, respectively. Accordingly, the drum 15 contacts with the tape to operate the tape. Thereafter, the operation of the loading motor is discontinued and the rotational force is not transmitted to the loading cam 1.

On the contrary, in case of unloading the VCT, the loading motor is again activated to rotate the loading cam 1 in the clockwise direction as shown in FIG. 2(B), so that the tape loading device operates in the opposite direction to unload the tape from the drum 15. As shown in FIG. 2(A) and 2(B), the geared part 1b of the loading cam 1 is again engaged with the geared part 2c of the pinion to transmit the rotational force fo the loading cam 1 to the pinion 2. In succession, the rack 3 in mesh with the geared part 2d of the pinion is straightly moved in the right direction as shown in FIG. 2(B). The operating gear 4a of the side arm 4 in mesh with the other rack 3' which is formed integral with the rack 3 is rotated around the supporting shaft 8 in the counterclockwise direction by transforming the rectilinear motion of the rack 3' into the rotary motion of the operating gear 4a.

Therefore, the holder pin 6a of the cassette holder 6 moves along the guide slot 7 formed on the side wall of the housing 5, and then the VCT inserted in the deck is unloaded to return the initial state.

Further, in the other embodiments, said actions and effects can be accomplished as the gear tooth are formed on the entire periphery of the loading cam 1 and the circular cam part 2b of the pinion 2 contacts with the rack 3, or the circular cam part 4b of the operating gear 4a formed integral with the side arm 4 contacts with the other rack 3' to rotate idly. Namely, the idling rotation also occurs in the circular cam part 2b of the pinion 2 or the circular cam part 4b of the operating gear 4a.

As mentioned above, the operation of the cassette holder and the idling rotation may be simultaneously attained according to the present invention. Moreover, the present invention may decrease the number of component elements in more simple structure to cut down the production costs and the assembling time, and to improve the productivity and the miniaturization of the products.

The invention is in no way limited to the embodiments described hereinabove. Various modifications of disclosed embodiments as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An idling rotation mechanism in a housing of a video cassette tape recorder, comprising:
    cassette loading means for loading and unloading a cassette into and out of a deck part within said housing;
    tape loading means for moving a tape, within said cassette loaded into said deck, into contact with a drum;
    a single motor for driving said cassette loading means and said tape loading means, said motor being able to rotate in clockwise and counterclockwise directions;
    loading cam means for preventing said tape loading means from being driven during operation of said cassette loading means; and
    idling rotation means for preventing said cassette loading means from being driven during operation of said tape loading means after completion of the cassette loading.

2. An idling rotation mechanism as claimed in claim 1, wherein said idling rotation means comprises:
    a first geared part formed on a portion of said loading cam means; and
    a second geared part formed on a portion of a pinion, said first geared part being engaged with said second geared part and said loading cam means being contacted with said pinion to rotate idly.

3. An idling rotation mechanism as claimed in claim 1, wherein said idling rotation means comprises:
    a first rack; and
    a circular cam part formed on a portion of a pinion, said first rack being contacted with said circular cam part to rotate idly.

4. An idling rotation mechanism as claimed in claim 1, wherein said idling rotation means comprises:
    a second rack; and
    a circular cam part of an operating gear formed integral with a side arm, said second rack being contacted with said circular cam part of said operating gear to rotate idly.

5. An idling rotation mechanism as claimed in claim 1, wherein said cassette loading means comprises:
 a rack, having a geared part;
 a side arm, having an operating gear engaged with the geared part of said rack, moving along a guide slot, around a supporting axis, according to the motion of said rack;
 a cassette holder, attached to said side arm, moveable with said side arm into a loaded and unloaded position.

6. An idling rotation mechanism as claimed in claim 1, wherein said tape loading means comprises:
 a loading cam, rotated clockwise or counterclockwise by a loading motor;
 a pin, inside a cam groove of said loading cam, moveable along said cam groove with the rotation of said loading cam;
 a sector gear, fastened to said pin, moveable with the rotation of said loading gear;
 a first loading gear engaged with said sector gear;
 a second loading gear engaged with said first loading gear;
 a plurality of loading grooves each connected to a respective loading gear;
 a plurality of links each connected between a respective loading gear and loading groove;
 a plurality of pole bases each connected to a respective link, made to move along a respective loading groove by rotation of a respective loading gear to allow and prohibit contact between said tape within the cassette and said drum.

7. The video tape recorder as claimed in claim 1, wherein said cassette loading mechansim comprises:
 a rotatable pinion, a lear gear means, a rotatable arm and a cassette holder;
 wherein rotation of said pinion is transmitted to said rotatable arm via said linear gear means to thereby move the cassette holder to move said video tape cassette into and out of said video tape recorder.

8. The video tape recorder as claimed in claim 7, wherein said means for preventing simultaneous operation includes a first means on said arm for disengaging said linear gear means thereby preventing said cassette holder from moving when said tape loading mechanism is in operation.

9. An idling rotation mechanism is a housing of a video cassette recorder, comprising:
 a cassette holder;
 a loading motor activated by sensors in said cassette holder when a cassette tape is inserted in said cassette holder;
 a loading cam, rotated clockwise or counterclockwise by said loading motor;
 a pinion, having a first geared part meshing with a geared part of said loading cam, rotating with said loading cam and allowing for idle rotation of said loading cam when not meshed;
 a rack, having a geared part meshing with a second geared part of said pinion, moving according to the rotation of said pinion and allowing for idle rotation of said pinion when not meshed;
 a side arm, having an operating gear engaged with said rack, moving along a guide slot, around a supporting axis, when said rack is engaged with said operating gear and allowing said operating gear to idly rotate when not engaged;
 a pin, inside a cam groove of said loading cam, moveable along said cam groove with the rotation of said loading cam;
 a sector gear, fastened to said pin, moveable with the rotation of said loading cam;
 a first loading gear engaged with said sector gear;
 a second loading gear engaged with said first loading gear;
 a plurality of loading grooves each connected to a respective loading gear;
 a plurality of links each connected between a respective loading gear and loading groove;
 a plurality of pole bases each connected to a respective link, made to move along a respective loading groove by rotation of a respective loading gear to allow and prohibit contact between a tape within the cassette tape and a tape drum.

10. A video cassette tape recorder comprising:
 a cassette loading mechanism for operably moving a video tape cassette into and out of said video tape recorder;
 a tape loading mechanism for oeprably moving a video tape of said video tape cassette into and out of its operative position;
 a single motor for driving said cassette loading mechanism and said tape loading mechanism; and
 means for preventing simultaneous operation of both said cassette loading mechanism and said tape loading mechanism.

11. The video cassette tape recorder as claimed in claim 10, wherein said motor rotates a cam having two driving portions, each for driving a respective one of said mechanisms.

12. The video cassette tape recorder as claimed in claim 11, wherein said driving portion for driving said cassette loading mechanism comprises:
 gear teeth provided in a peripheral surface of the cam.

13. The video cassette tape recorder as claimed in claim 10, wherein said cassette loading mechanism comprises:
 a pinion having gear teeth which mesh said gear teeth of said cam; and
 wherein said means for preventing simultaneous operation comprises a surface on said pinion, adjacent said pinion gear teeth, which enables the cam gear teeth to pass over said pinion gear teeth without drivng said pinion.

14. The video cassette tape recorder as claimed in claim 11, wherein said driving portion for driving said tape loading mechanism comprises:
 a cam groove in a flat surface of said cam.

15. the video tape recorder as claimed in claim 14, wherein said tape loading mechanism comprises:
 a sector gear connected to a pin, wherein said pin is driven by said groove.

16. The video tape recorder as claimed in claim 15, wherein said tape loading mechanism further comprises:
 a first gear wheel being driven by said sector gear;
 a second gear wheel being driven by said first gear wheel; and
 respective loading means connected to said first and second gear wheels for moving said video tape of said video tape cassette into and out of said operative position.

* * * * *

UNITED STATES PATENT AND TRADEMARK OFFICE
CERTIFICATE OF CORRECTION

PATENT NO. : U.S. 5,034,830
DATED : July 23, 1991
INVENTOR(S) : Jung-Jae LEE It is certified that error appears in the above-identified patent and that said Letters Patent is hereby corrected as shown below:

Column 2, Line 63, change "laoded" to --loaded--;

Column 4, Line 2, change "tooth" to --teeth--.

IN THE CLAIMS

Claim 7, Column 5, Line 35, change "lear" to --linear--;

Claim 9, Column 6, Line 12, insert --and-- after "groove";

Claim 10, Column 6, Line 18, insert --,-- after "recorder";

Line 22, change "oeprably" to --operably--;

Claim 13, Column 6, Line 48, change "drivng" to --driving--;

Claim 15, Column 6, Line 53, change "the" to --The--.

Signed and Sealed this

Ninth Day of February, 1993

Attest:

STEPHEN G. KUNIN

*Attesting Officer*   Acting Commissioner of Patents and Trademarks

REEXAMINATION CERTIFICATE (1965th)
United States Patent [19]
Lee

[11] B1 5,034,830
[45] Certificate Issued  Mar. 30, 1993

[54] IDLING ROTATION MECHANISM USED IN THE HOUSING OF A VIDEO CASSETTE TAPE RECORDER

[75] Inventor: Jung-Jae Lee, Seoul, Rep. of Korea

[73] Assignee: SamSung Electronics Co., Ltd., Suweon, Rep. of Korea

Reexamination Request:
No. 90/002,749, Jun. 9, 1992

Reexamination Certificate for:
Patent No.: 5,034,830
Issued: Jul. 23, 1991
Appl. No.: 454,464
Filed: Dec. 21, 1989

Certificate of Correction issued Feb. 9, 1993.

[30] Foreign Application Priority Data

Jun. 9, 1989 [KR] Rep. of Korea ............... 89-8076

[51] Int. Cl.$^5$ ............ G11B 15/675; G11B 15/665
[52] U.S. Cl. .................... 360/85; 360/95; 360/96.5
[58] Field of Search ............ 360/85, 95, 93, 96.5

[56] References Cited
U.S. PATENT DOCUMENTS

| | | | |
|---|---|---|---|
| 4,685,009 | 8/1987 | Min et al. | 360/95 |
| 4,807,065 | 2/1989 | Kwon | 360/85 |
| 4,884,153 | 11/1989 | Ahn | 360/85 |
| 4,912,578 | 3/1990 | Katohno et al. | 360/85 |

*Primary Examiner*—John H. Wolff

[57] ABSTRACT

An idling rotation mechanism in a housing of a video cassette tape recorder, including a cassette loading device for loading and unloading a cassette in and out of a deck, a tape loading device for moving a video cassette tape inserted in the deck into a position of magnetic transformation, a single motor for driving the cassette loading device and the tape loading device, said motor being able to rotate in clockwise and counterclockwise direction, a loading cam device for preventing the tape loading device from being driven during the operation of the cassette loading device, and an idling rotation device of the housing for preventing the cassette loading means from being driven during the operation of the tape loading device, after the completion of the cassette loading. Both the operation of the cassette holder and the idling rotation may be simultaneously attained according to the present invention.

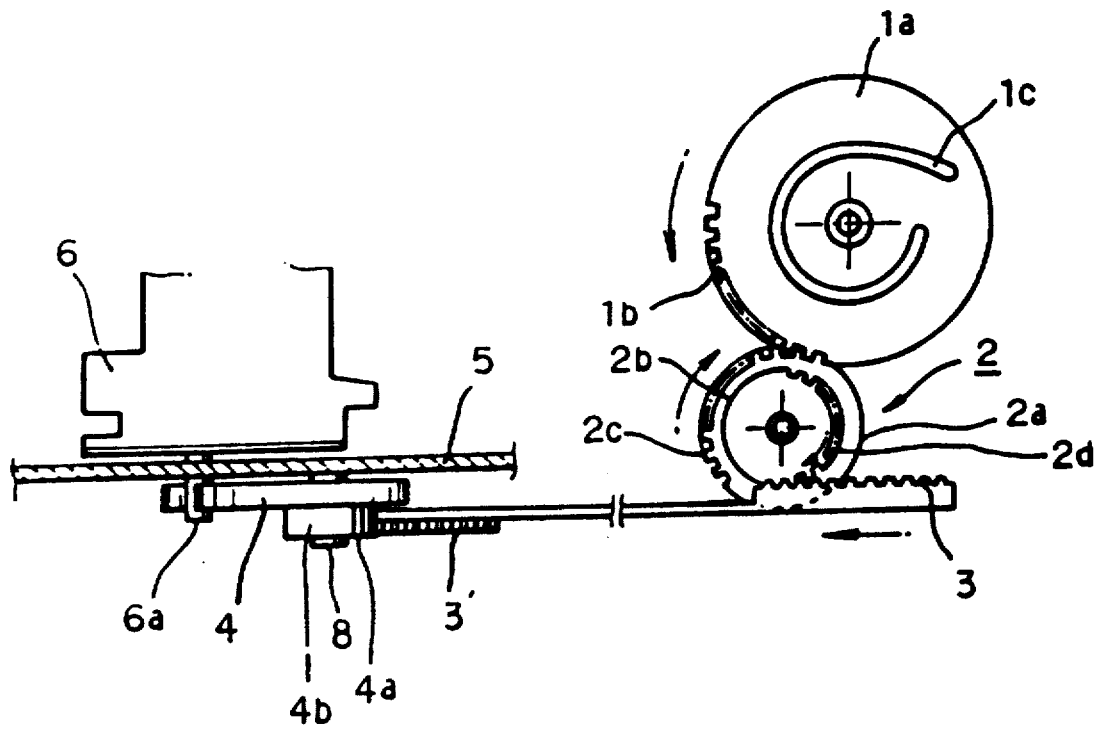

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

As A RESULT OF REEXAMINATION, IT HAS BEEN DETERMINED THAT:

Claim 6 is cancelled.

Claims 1–5, 7–11 and 13 are determined to be patentable as amended.

Claims 12 and 14–16, dependent on an amended claim are determined to be patentable.

New claims 17–30 are added and determined to be patentable.

1. An idling rotation mechanism in a housing of a video cassette tape recorder, comprising:
    cassette loading means for loading and unloading a cassette into and out of a deck part within said housing;
    tape loading means for moving a tape, within said cassette loaded into said deck, into contact with a drum;
    a single motor for driving said cassette loading means and said tape loading means, said motor being able to rotate in clockwise and counterclockwise directions; *and*
    *a single* loading cam [means] *including a first portion thereof* for preventing said tape loading means from being driven during operation of said cassette loading means[; and], *and a second* [idling rotation means] *portion thereof* for preventing said cassette loading means from being driven during operation of said tape loading means after completion of the cassette loading.

2. [An idling rotation mechanism as claimed in claim 1,] *An idling rotation mechanism in a housing of a video cassette tape recorder, comprising:*
    *cassette loading means for loading and unloading a cassette into and out of a deck part within said housing;*
    *tape loading means for moving a tape, within said cassette loaded into said deck, into contact with a drum;*
    *a single motor for driving said cassette loading means and said tape loading means, said motor being able to rotate in clockwise and counterclockwise directions;*
    *loading cam means for preventing said tape loading means from being driven during operation of said cassette loading means; and*
    *idling rotation means for preventing said cassette loading means from being driven during operation of said tape loading means after completion of the cassette loading, wherein said idling rotation means comprises:*
    a first geared part formed on a portion of said loading cam means; and
    a second geared part formed on a portion of a pinion, said first geared part being [engaged] *disengaged* with said second geared part and said loading cam means being contacted with said pinion to rotate idly.

3. [An idling rotation mechanism as claimed in claim 1,] *An idling rotation mechanism in a housing of a video cassette tape recorder, comprising:*
    *cassette loading means for loading and unloading a cassette into and out of deck part within said housing;*
    *tape loading means for moving a tape, within said cassette loaded into said deck, into contact with a drum;*
    *a single motor for driving said cassette loading means and said tape loading means, said motor being able to rotate in clockwise and counterclockwise directions;*
    *loading cam means for preventing said tape loading means from being driven during operation of said cassette loading means; and*
    *idling rotation means for preventing said cassette loading means from being driven during operation of said tape loading means after completion of the cassette loading, wherein said idling rotation means comprises:*
    a first rack; and
    a circular cam part formed on a portion of a pinion, said first rack being contacted with said circular cam part to rotate idly.

4. [An idling rotation mechanism as claimed in claim 1,] *An idling rotation mechanism in a housing of a video cassette tape recorder, comprising:*
    *cassette loading means for loading and unloading a cassette into and out of a deck part within said housing;*
    *tape loading means for moving a tape, within said cassette loaded into said deck, into contact with a drum;*
    *a single motor for driving said cassette loading means and said tape loading means, said motor being able to rotate in clockwise and counterclockwise directions;*
    *loading cam means for preventing said tape loading means from being driven during operation of said cassette loading means; and*
    *idling rotation means for preventing said cassette loading means from being driven during operation of said tape loading means after completion of the cassette loading wherein said idling rotation means comprises:*
    a [second] *first* rack; and
    a circular cam part of an operating gear formed integral with a side arm, said [second] *first* rack being contacted with said circular cam part of said operating gear to rotate idly.

5. [An idling rotation mechanism as claimed in claim 1,] *An idling rotation mechanism in a housing of a video cassette tape recorder, comprising:*
    *cassette loading means for loading and unloading a cassette into and out of a deck part within said housing;*
    *tape loading means for moving a tape, within said cassette loaded into said deck, into contact with a drum;*
    *a single motor for driving said cassette loading means and said tape loading means, said motor being able to rotate in clockwise and counterclockwise directions;*
    *loading cam means for preventing said tape loading means from being driven during operation of said cassette loading means; and*
    *idling rotation means for preventing said cassette loading means from being driven during operation of said tape loading means after completion of the cassette*

*loading,* wherein said cassette loading means comprises:
  a rack, having a geared part;
  a side arm, having an operating gear engaged with the geared part of said rack, moving along a guide slot, around a supporting axis, according to the motion of said rack;
  a cassette holder, attached to said side arm, moveable with said side arm into a loaded and unloaded position.

7. [The video tape recorder as claimed in claim 1,] *An idling rotation mechanism in a housing of a video cassette tape recorder, comprising:*
  *cassette loading means for loading and unloading a cassette into and out of a deck part within said housing;*
  *tape loading means for moving a tape, within said cassette loaded into said deck, into contact with a drum;*
  *a single motor for driving said cassette loading means and said tape loading means, said motor being able to rotate in clockwise and counterclockwise directions;*
  *loading cam means for preventing said tape loading means from being driven during operation of said cassette loading means; and*
  *idling rotation means for preventing said cassette loading means from being driven during operation of said tape loading means after completion of the cassette loading,*
  wherein said cassette loading mechanism comprises:
  a rotatable pinion, a [lear] *linear* gear means, a rotatable arm and a cassette holder; *and*
  wherein rotation of said pinion is transmitted to said rotatable arm via said linear gear means to thereby move the cassette holder to move said video tape cassette into and out of said video tape recorder.

8. The video tape recorder as claimed in claim 7, wherein said *idling rotation* means [for preventing simultaneous operation] includes a first means on said arm for disengaging said linear gear means thereby preventing said cassette holder from moving when said tape loading mechanism is in operation.

9. An idling rotation mechanism [is] *in* a housing of a video cassette recorder, comprising:
  a cassette holder;
  a loading motor activated by sensors in said cassette hold when a cassette tape is inserted in said cassette holder;
  a loading cam, rotated clockwise or counterclockwise by said loading motor;
  a pinion, having a first geared part meshing with a geared part of said loading cam, rotating with said loading cam, and allowing for idle rotation of said loading cam when not meshed;
  a rack, having a geared part meshing with a second geared part of said pinion, moving according to the rotation of said pinion and allowing for idle rotation of said pinion when not meshed;
  a side arm, having an operaitng gear engaged with said rack, moving along a guide slot, around a supporting axis, when said rack is engaged with said operating gear and allowing said operating gear to idly rotate when not engaged;
  a pin, inside a cam groove of said loading cam, moveable along said cam groove with the rotation of said loading cam;
  a sector gear, fastened to said pin, moveable with the rotation of said loading cam;
  a first loading gear engaged with said sector gear;
  a second loading gear engaged with said first loading gear;
  a plurality of loading grooves each connected to a respective loading gear;
  a plurality of links each connected between a respective loading gear and loading groove; and
  a plurality of pole bases each connected to a respective link, made to move along a respective loading groove by rotation of a respective loading gear to allow and prohibit contact between a tape within the cassette tap and a tape drum.

10. A video cassette tape recorder, comprising:
  a cassette loading mechanism for operably moving a video cassette into and out of said video tape recorder;
  a tape loading mechanism for operably moving a video tape of said video tape cassette into and out of its operative position;
  a single motor for driving said cassette loading mechanism and said tape loading mechanism; and
  [means] *a single rotatable loading cam, coupled to said single motor to said cassette loading mechanism and to said tape loading mechanism, for causing each of said tape loading mechanism and said cassette loading mechanism to operate, and* for preventing simultaneous operation of both said cassette loading mechanism and said tape loading mechanism.

11. [The video cassette tape recorder as claimed in claim 10,] *A video cassette tape recorder comprising:*
  *a cassette loading mechanism for operably moving a video cassette into and out of said video tape recorder;*
  *a tape loading mechanism for operably moving a video tape of said video tape cassette into and out of its operative position;*
  *a single motor for driving said cassette loading mechanism and said tape loading mechanism; and*
  *means for preventing simultaneous operation of both said cassette loading mechanism and said tape loading mechanism,*
  wherein said motor rotates a cam having two driving portions, each for driving a respective one of said mechanisms.

13. The video cassette tape recorder as claimed in claim [10] *11*, wherein said cassette loading mechanism comprises:
  a pinion having gear teeth which mesh said gear teeth of said cam; and
  wherein said means for preventing simultaneous operation comprises a surface on said pinion, adjacent said pinion gear teeth, which enables the cam gear teeth to pass over said pinion gear teeth without driving said pinion.

*17. An idling rotation mechanism as claimed in claim 1, wherein said first portion comprises a cam groove formed on said single loading cam, a portion of said cam groove being concentric and another portion of said cam groove being non-concentric.*

*18. An idling rotation mechanism as claimed in claim 17, wherein said tape loading means comprises a sector gear, a pin disposed within said cam groove, and tape extracting elements operatively engaged with said sector gear.*

*19. An idling rotation mechanism as claimed in claim 18, wherein said sector gear is so positioned with respect to said pin, said cam groove and said tape extracting elements, to cause said sector gear to drive said tape extracting elements to extract said tape and load said extracted tape onto said drum when said pin traverses said non-concentric portion of said cam groove.*

20. An idling rotation mechanism as claimed in claim 19, wherein said tape extracting elements comprise a first moveable member, a second moveable member coupled to said first moveable member, a pair of links coupled to said first and second moveable members, respectively, and a pair of pole bases coupled to said pair of links, respectively, each of said pole bases being moveable along a respective groove to cause the tape within said cassette to contact said drum.

21. An idling rotation mechanism as claimed in claim 1, wherein said cassette loading means includes a first rotatable gear coupled to said single loading cam, a second gear coupled to said first rotatable gear, and a cassette holder coupled to said second gear, said cassette holder being movable, with said second gear during operation of said cassette loading means, into a loaded and an unloaded position.

22. An idling rotation mechanism as claimed in claim 21, wherein said second gear is a linear rack gear.

23. An idling rotation mechanism as claimed in claim 1, wherein said first portion is different from said second portion.

24. An idling rotation mechanism as claimed in claim 23, wherein said first portion is a groove disposed on a face of said single loading cam.

25. The video cassette tape recorder as claimed in claim 10, wherein said single rotatable loading cam includes a cam groove formed on said single loading cam, a portion of said cam groove being concentric and another portion of said cam groove being non-concentric.

26. The video cassette tape recorder as claimed in claim 25, wherein said tape loading means comprises a sector gear, a pin disposed within said cam groove, and tape extracting elements operatively engaged with said sector gear.

27. The video cassette tape recorder as claimed in claim 26, wherein said sector gear is so positioned with respect to said pin, said cam groove and said tape extracting elements, to cause said sector gear to drive said tape extracting elements to extract said tape and load said extracted tape onto said drum when said pin traverses said non-concentric portion of said cam groove.

28. The video cassette tape recorder as claimed in claim 10, wherein said cassette loading mechanism includes a first rotatable gear coupled to said loading cam, a second gear coupled to said first rotatable gear, and a cassette holder coupled to said second gear, said cassette holder being movable, with said second gear during operation of said cassette loading means, into a loaded and an unloaded position.

29. The video cassette tape recorder as claimed in claim 28, wherein said second gear is a linear rack gear.

30. The video cassette tape recorder as claimed in claim 14, wherein a portion of said cam groove is concentric, and another portion of said cam groove is non-concentric.

* * * * *